(12) United States Patent
Chen et al.

(10) Patent No.: US 9,066,102 B2
(45) Date of Patent: Jun. 23, 2015

(54) REFERENCE PICTURE LIST CONSTRUCTION FOR GENERALIZED P/B FRAMES IN VIDEO CODING

(75) Inventors: Ying Chen, San Diego, CA (US);
Wei-Jung Chien, San Diego, CA (US);
Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 619 days.

(21) Appl. No.: 13/274,972

(22) Filed: Oct. 17, 2011

(65) Prior Publication Data
US 2012/0121017 A1 May 17, 2012

Related U.S. Application Data

(60) Provisional application No. 61/414,668, filed on Nov. 17, 2010, provisional application No. 61/500,029, filed on Jun. 22, 2011.

(51) Int. Cl.
*H04N 7/12* (2006.01)
*H04N 11/02* (2006.01)
(Continued)

(52) U.S. Cl.
CPC ........... *H04N 19/174* (2014.11); *H04N 19/159* (2014.11); *H04N 19/70* (2014.11); *H04N 19/46* (2014.11); *H04N 19/61* (2014.11); *H04N 19/109* (2014.11)

(58) Field of Classification Search
CPC .................. H04N 19/00545; H04N 19/00721; H04N 19/00884
USPC ............................. 375/240.12, 240.15, 240.16
See application file for complete search history.

(56) References Cited

U.S. PATENT DOCUMENTS

| 6,072,831 A | 6/2000 | Chen |
| 7,733,959 B2 | 6/2010 | Chiou et al. |

(Continued)

FOREIGN PATENT DOCUMENTS

| CN | 1694502 A | 11/2005 |
| EP | 1377067 A1 | 1/2004 |

(Continued)

OTHER PUBLICATIONS

Li et al., "Reduncancy reduction in B-frame coding at temporal level zero", JCTVC-C278, Joint Collaborative Team on Video Coding (JCT-VC) of ITU-T SG16 WP3 and ISO/IEC JTC1/SC29/WG11, Oct. 2011.*

(Continued)

*Primary Examiner* — William C Vaughn, Jr.
*Assistant Examiner* — Stuart Bennett
(74) *Attorney, Agent, or Firm* — Shumaker & Sieffert, P.A.

(57) ABSTRACT

This disclosure relates to techniques for indicating that a video frame is coded as a generalized P/B (GPB) frame in order to reduce a cost of coding and constructing a second reference picture list in video coding. For a GPB frame, which has identical reference picture lists, signaling and constructing both the first and second reference picture lists may be redundant. The techniques of this disclosure may include coding syntax elements indicating that the video frame is coded as the GPB frame, and coding syntax elements indicating a number of reference pictures and reference picture list construction commands for only a first reference picture list. The techniques also include constructing the first reference picture list based on the syntax elements, and then creating the second reference picture list as a duplicate of the first reference picture list.

34 Claims, 6 Drawing Sheets

(51) Int. Cl.

| | |
|---|---|
| H04N 11/04 | (2006.01) |
| H04N 19/70 | (2014.01) |
| H04N 19/174 | (2014.01) |
| H04N 19/159 | (2014.01) |
| H04N 19/46 | (2014.01) |
| H04N 19/61 | (2014.01) |
| H04N 19/109 | (2014.01) |

(56) References Cited

U.S. PATENT DOCUMENTS

| | | | |
|---|---|---|---|
| 7,852,916 | B2 | 12/2010 | Duvivier |
| 2002/0118758 | A1 | 8/2002 | Sekiguchi et al. |
| 2004/0252768 | A1 | 12/2004 | Suzuki et al. |
| 2005/0100093 | A1* | 5/2005 | Holcomb ............... 375/240.12 |
| 2006/0083298 | A1 | 4/2006 | Wang et al. |
| 2006/0146143 | A1 | 7/2006 | Xin et al. |
| 2007/0064809 | A1 | 3/2007 | Watanabe et al. |
| 2007/0291131 | A1 | 12/2007 | Suzuki et al. |
| 2009/0003445 | A1 | 1/2009 | Ying et al. |
| 2009/0175334 | A1 | 7/2009 | Ye et al. |
| 2009/0310677 | A1 | 12/2009 | Shiodera et al. |
| 2009/0323813 | A1 | 12/2009 | Maciel de Faria et al. |
| 2010/0040139 | A1 | 2/2010 | Marpe et al. |
| 2010/0040148 | A1 | 2/2010 | Marpe et al. |
| 2010/0086029 | A1 | 4/2010 | Chen et al. |
| 2010/0091857 | A1 | 4/2010 | Lee |
| 2010/0150234 | A1* | 6/2010 | Koo et al. ............... 375/240.12 |
| 2010/0260262 | A1 | 10/2010 | Coban et al. |
| 2010/0296579 | A1 | 11/2010 | Panchal et al. |
| 2013/0107959 | A1* | 5/2013 | Park et al. ............... 375/240.15 |
| 2013/0272404 | A1* | 10/2013 | Park et al. ............... 375/240.15 |

FOREIGN PATENT DOCUMENTS

| | | | |
|---|---|---|---|
| EP | 1806930 | A1 | 7/2007 |
| KR | 20060069838 | A | 6/2006 |
| TW | 200803517 | A | 1/2008 |
| WO | WO2004030369 | A1 | 4/2004 |
| WO | 2004080078 | A1 | 9/2004 |
| WO | 2009049250 | | 4/2009 |
| WO | WO2009114054 | A1 | 9/2009 |

OTHER PUBLICATIONS

Richardson, Iain E. G., "H.264 and MPEG-4 Video Compression", John Wiley & Sons Ltd., 2003.*

Leontaris, Athanasios and A. M. Tourapis, "Weighted prediction methods for improved motion compensation", 16th IEEE International Conference on Image Processing (ICIP), 2009, pp. 1029-1032.*

Flierl, Markus and Bernd Girod, "Generalized B Pictures and the Draft H.264/AVC Video-Compression Standard", IEEE Transactions on Circuits and Systems for Video Technology, vol. 13, No. 7, Jul. 2003.*

Li et al., "Redundancy reduction in B-frame coding at temporal level zero", JCTVC-C278, Joint Collaborative Team on Video Coding (JCT-VC) of ITU-T SG16 WP3 and ISO/IEC JTC1/SC29/WG11, Oct. 2010.*

Anonymous "Test Model under Consideration (TMuC)," Joint Collaborative Team on Video Coding, Document: JCTVC-A205, Jul. 16, 2010, 154 pp.

Li, B. et al., "Redundancy reduction in B-frame coding at temporal level zero", Joint Collaborative Team on Video Coding, Document: JCTVC-C278, Oct. 2, 2010, 6 pp.

Samsung et al., "TEncGOP.cppN, Test Model Under Consideration for HEVC Internet Citation," Retrieved from URL: http://hevc.kw.bbc.co.uk/git/w/jctvc-hm/jctvc-hm-tsm.git/blob/3d7201db6989c276d091367c4e6447794a012900:/source/Lib/TLibEncoder/TEncGOP.cpp, retrieved on Nov. 30, 2011, 16 pp.

U.S. Appl. No. 13/179,400, by Wei-Jung Chien, filed Jul. 8, 2011.

U.S. Appl. No. 13/179,427, by Wei-Jung Chien, filed Jul. 8, 2011.

Chien et al., "Modified Uni-directional Inter Prediction in Generalized P and B Picture," JCT-VC, Document JCTVC-C285, Oct. 7-15, 2010, 2 pp.

Siu, et al., "On Transcoding a B-Frame to a P-Frame in the Compressed Domain," IEEE Transaction on Multimedia, vol. 9, No. 6, Oct. 2007, 10 pp.

"Test Model under Consideration," JCT-VC, Document JCTVC-A205, Apr. 15-23, 2010, 30 pp.

Bao et al., "A Low-Complexity AVC-based Scalable Video Codec," Document VCEG-Y 13, Nokia Research Center, Geneva, Switzerland, Nov. 22-24, 2004, 15 pp.

Flierl et al., "Generalized B Pictures and the Draft H.264/AVC Video Compression Standard," IEEE Transactions on Circuits and Systems for Video Technology, vol. 13. No. 7, Jul. 2003, 12 pp.

Bross et al., "WD4: Working Draft 4 of High-Efficiency Video Coding," 6th Meeting: JCTVC-F803_d2, Torino, IT, Jul. 14-22, 2011, 226 pp.

Chen Y et al : "Comments on Generalized P and B Pictures," 4th JCT-VC Meeting, MPEG Meeting; Jan. 20, 2011-Jan. 28, 2011; DAEGU, No. JCTVC-D401, Jan. 16, 2011, 4 pp.

International Preliminary Report on Patentability—PCT/US2011/060426, The International Bureau of WIPO—Geneva, Switzerland, Feb. 1, 2013, 11 pp.

Second Written Opinion from International Application No. PCT/US2011/060426 dated Oct. 19, 2012, 7 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011,193 pp.

Yin et al., "Unification of Motion Vector Prediction Methods," 5th JVT Meeting, Oct. 14, 2002-Oct. 18, 2002; Geneva, CH, No. JVT-EO61rl, Oct. 18, 2002, 12 pp.

Zheng et al., "Extended Motion Vector Prediction for Bi predictive Mode," 5th JCT-VC Meeting, MPEG Meeting; Mar. 16, 2011-Mar. 23, 2011, No. JCTVC-E343, Mar. 11, 2011, 4 pp.

Anonymous, "Test Model under Consideration (draft007)", International Organisation for Standardization, Apr. 2010, 152 pp.

International Search Report and Written Opinion—PCT/US2011/060426—ISA/EPO—Mar. 29, 2012—14 pp.

Leontaris et al., "Weighted prediction methods for improved motion compensation", IEEE International Conference on Image Processing, Nov. 2009, 4 pp.

Ono et al., "Ubiquitous Technology, High-Efficiency Coding of Moving Images—MPEG-4 and H.264-," Ohmsha Ltd., 1st ed., Apr. 20, 2005, pp. 101-120, ISBN: 4-274-20060-4.

Ono S., et al., "High Efficiency Moving Image Coding of Ubiquitous Technology MPEG-4 and H.264," 1st ed., Ohmsha Ltd., Apr. 20, 2005, pp. 103-105, ISBN: 4-274-20060-4, FIGS. 5.1 and 5.3.

U.S. Appl. No. 61/368,529, filed Jul. 28, 2010, inventor Wei-Jung Chien et al.

U.S. Appl. No. 61/376,583, filed Aug. 24, 2010, inventor Wei-Jung Chien et al.

Li, B. et al., "Redundancy reduction in B-frame coding at temporal level zero", Joint Collaborative Team on Video Coding, Document: JCTVC-C278, Oct. 2, 2010, 9 pp.

* cited by examiner

REFERENCE PICTURE LIST CONSTRUCTION FOR GENERALIZED P/B FRAMES IN VIDEO CODING

This application claims the benefit of U.S. Provisional Application No. 61/414,668, filed Nov. 17, 2010, and U.S. Provisional Application No. 61/500,029, filed Jun. 22, 2011, each of which is hereby incorporated by reference in its respective entirety.

TECHNICAL FIELD

This disclosure relates to video coding and, more particularly, video inter-coding techniques.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into video blocks or coding units (CUs). Video blocks in an intra-coded (I) frame or slice are encoded using spatial prediction with respect to neighboring blocks in the same frame or slice. Video blocks in an inter-coded (P or B) frame or slice may use spatial prediction with respect to neighboring blocks in the same frame or slice or temporal prediction with respect to other reference pictures. Video blocks in a bidirectional predicted (B) frame may be encoded using bidirectional prediction to calculate two motion vectors from two different reference picture lists, traditionally one past frame and one future frame in terms of display order. Video blocks in a unidirectional predicted (P) frame may be encoded using unidirectional prediction to calculate a single motion vector from a single reference picture list, traditionally a past frame.

SUMMARY

In general, this disclosure relates to techniques for indicating that a video frame is coded as a generalized P/B (GPB) frame in order to reduce a cost of coding and constructing a second reference picture list in video coding. In the work of the Joint Collaborative Team on Video Coding (JCT-VC) for the emerging HEVC standard, the concept of a GPB frame has been proposed. A GPB frame may be a special case of a bidirectional predicted (B) frame concept. More specifically, a video frame may be coded as a GPB frame with respect to reference pictures in at least one of a first reference picture list and a second reference picture list that are identical.

For a GPB frame, which has identical reference picture lists, signaling and constructing both the first and second reference picture lists may be redundant. The techniques of this disclosure may include coding syntax elements indicating that the video frame is coded as the GPB frame, and coding syntax elements indicating a number of reference pictures and reference picture list construction commands for only a first reference picture list. By explicitly informing a video decoder that the video frame is coded as the GPB frame, the video decoder may expect to receive the syntax elements for only the first reference picture list. The techniques also include constructing the first reference picture list based on the syntax elements, and then creating the second reference picture list as a duplicate of the first reference picture list. In this way, the second reference picture list has the same number of reference pictures as the first reference picture list and the same reference picture ordering as the first reference picture list.

The techniques eliminate redundant syntax elements indicating numbers of reference pictures and reference picture list construction commands in slice header syntax of the GPB frame by only coding the syntax elements for the first reference picture list. Moreover, the techniques avoid redundant decoding processes to construct both the reference picture lists for the GPB frame at the video decoder by only constructing the first reference picture list based on the syntax elements, and then duplicating the first reference picture list as the second reference picture list.

In one example, the disclosure is directed toward a method of decoding video data comprising decoding one or more syntax elements indicating that a video frame is coded as a generalized P/B (GPB) frame with respect to reference pictures in at least one of a first reference picture list and a second reference picture list, wherein the first and second reference picture lists are identical, and decoding one or more syntax elements indicating a number of reference pictures and reference picture list construction commands for only the first reference picture list. The method further comprising constructing the first reference picture list at a video decoder based on the syntax elements, and creating the second reference picture list at the video decoder as a duplicate of the first reference picture list.

In another example, the disclosure is directed toward a method of encoding video data comprising encoding a video frame as a generalized P/B (GPB) frame with respect to reference pictures in at least one of a first reference picture list and a second reference picture list, wherein the first and second reference picture lists are identical, encoding one or more syntax elements indicating that the video frame is coded as the GPB frame, and encoding one or more syntax elements indicating a number of reference pictures and reference picture list construction commands for only the first reference picture list.

In a further example, the disclosure is directed toward a video decoding device comprising a memory that stores decoded reference pictures, and a processor configured to decode one or more syntax elements indicating that a video frame is coded as a generalized P/B (GPB) frame with respect to reference pictures in at least one of a first reference picture list and a second reference picture list, wherein the first and second reference picture lists are identical, decode one or more syntax elements indicating a number of reference pictures and reference picture list construction commands for only the first reference picture list, construct the first reference picture list based on the syntax elements, and create the second reference picture list as a duplicate of the first reference picture list.

In an additional example, the disclosure is directed toward a video encoding device comprising a memory that stores decoded reference pictures, and a processor configured to encode a video frame as a generalized P/B (GPB) frame with respect to reference pictures in at least one of a first reference picture list and a second reference picture list, wherein the first and second reference picture lists are identical, encode one or more syntax elements indicating that the video frame is coded as the GPB frame, and encode one or more syntax elements indicating a number of reference pictures and reference picture list construction commands for only the first reference picture list.

In another example, the disclosure is directed toward a video decoding device comprising means for decoding one or more syntax elements indicating that a video frame is coded as a generalized P/B (GPB) frame with respect to reference pictures in at least one of a first reference picture list and a second reference picture list, wherein the first and second reference picture lists are identical, and means for decoding one or more syntax elements indicating a number of reference pictures and reference picture list construction commands for only the first reference picture list. The video decoding device also includes means for constructing the first reference picture list at a video decoder based on the syntax elements, and means for creating the second reference picture list at the video decoder as a duplicate of the first reference picture list.

In a further example, the disclosure is directed toward a video encoding device comprising means for encoding a video frame as a generalized P/B (GPB) frame with respect to reference pictures in at least one of a first reference picture list and a second reference picture list, wherein the first and second reference picture lists are identical, means for encoding one or more syntax elements indicating that the video frame is coded as the GPB frame, and means for encoding one or more syntax elements indicating a number of reference pictures and reference picture list construction commands for only the first reference picture list.

In another example, the disclosure is directed toward a computer-readable storage medium comprising instructions for decoding video data that, upon execution in a processor, cause the processor to decode one or more syntax elements indicating that a video frame is coded as a generalized P/B (GPB) frame with respect to reference pictures in at least one of a first reference picture list and a second reference picture list, wherein the first and second reference picture lists are identical, decode one or more syntax elements indicating a number of reference pictures and reference picture list construction commands for only the first reference picture list, construct the first reference picture list at a video decoder based on the syntax elements, and create the second reference picture list at the video decoder as a duplicate of the first reference picture list.

In an additional example, the disclosure is directed toward a computer-readable storage medium comprising instructions for encoding video data that, upon execution in a processor, cause the processor to encode a video frame as a generalized P/B (GPB) frame with respect to reference pictures in at least one of a first reference picture list and a second reference picture list, wherein the first and second reference picture lists are identical, encode one or more syntax elements indicating that the video frame is coded as the GPB frame, and encode one or more syntax elements indicating a number of reference pictures and reference picture list construction commands for only the first reference picture list.

The details of one or more examples are set forth in the accompanying drawings and the description below. Other features, objects, and advantages will be apparent from the description and drawings, and from the claims.

DETAILED DESCRIPTION

This disclosure relates to techniques for indicating that a video frame is coded as a generalized P/B (GPB) frame in order to reduce a cost of coding and constructing a second reference picture list in video coding. A video frame may be coded as a GPB frame, for which the first reference picture list and the second reference picture list of which are identical. In this case, both of the reference pictures lists have the same number of pictures (denoted as N), and any picture with reference index i (i<N) in the first reference picture list is the same as the picture with reference index i in the second reference picture list. For a GPB frame, signaling and constructing both the first and second reference picture lists may be redundant.

The techniques of this disclosure may include coding syntax elements indicating that the video frame is coded as the GPB frame, and coding syntax elements indicating a number of reference pictures and reference picture list construction commands for only a first reference picture list. By explicitly informing a video decoder that the video frame is coded as the GPB frame, the video decoder may expect to receive the syntax elements for only the first reference picture list. The techniques also include constructing the first reference picture list based on the syntax elements, and then creating the second reference picture list as a duplicate of the first reference picture list. In this way, the second reference picture list has the same number of reference pictures as the first reference picture list and the same reference picture ordering as the first reference picture list.

Reference picture list construction for a reference picture list of a B frame typically includes two steps: reference picture list initialization and reference picture list reordering (i.e., modification). For example, during the reference picture list initialization step, a video decoding device may place reference pictures stored in a reference picture memory into a list based on the display order, or POC (Picture Order Count) values, of the reference pictures. Then, during to the reference picture list reordering step, the video decoder may modify a position of a reference picture placed in the list during the reference picture list initialization step to any other position, and may place any reference picture stored in the reference picture memory into the list at any position.

In this way, the techniques eliminate redundant syntax elements indicating reference picture list construction commands in slice header syntax of the GPB frame by only coding the syntax elements for the first reference picture list. Moreover, the techniques avoid redundant decoding processes to construct both the reference picture lists for the GPB frame at the video decoder by only constructing the first reference picture list based on the syntax elements, and then duplicating the first reference picture list as the second reference picture list.

Figure 1:
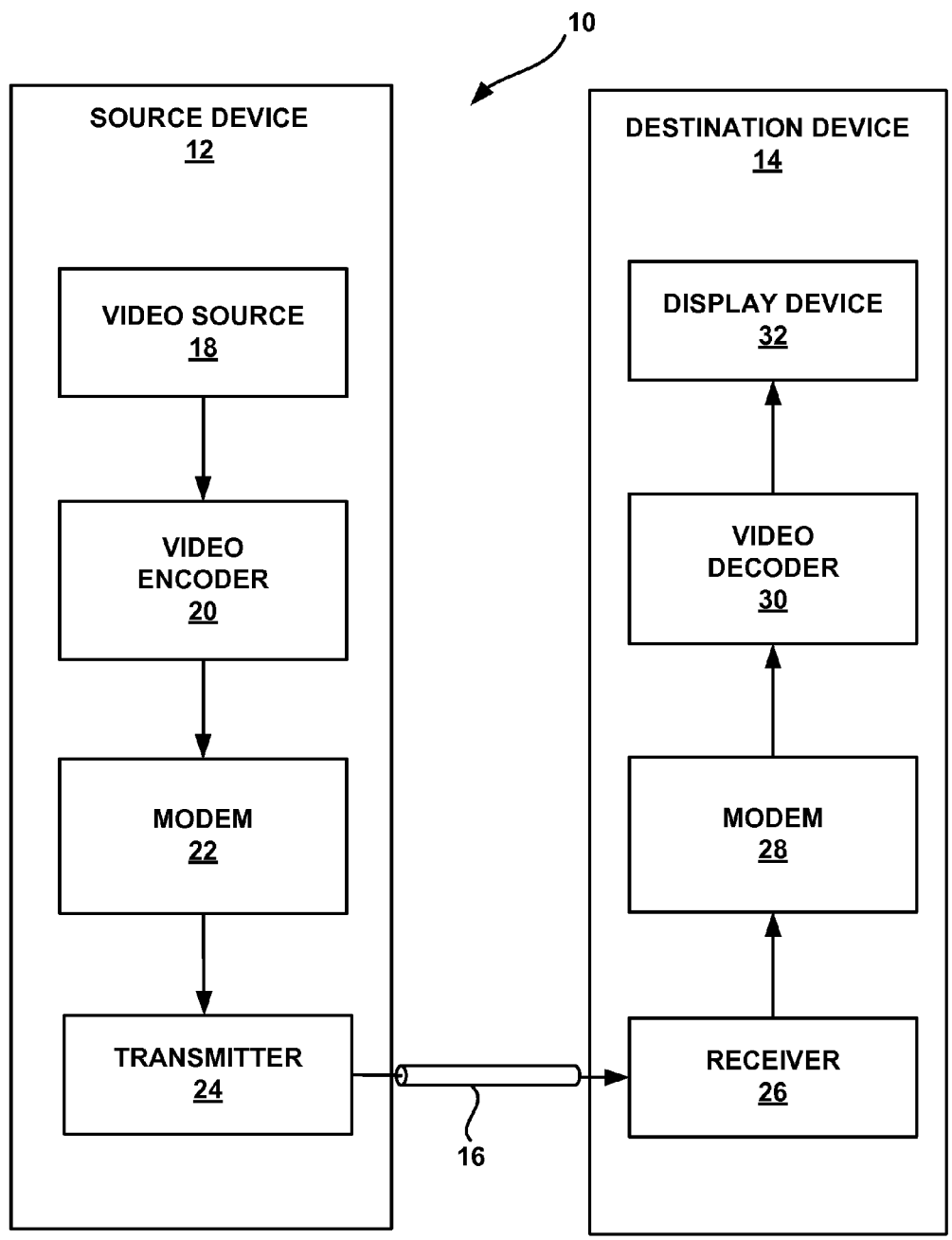
FIG. 1 is a block diagram illustrating an example video encoding and decoding system that may utilize techniques for efficiently coding and constructing reference picture lists for a GPB frame.

FIG. 1 is a block diagram illustrating an example video encoding and decoding system 10 that may utilize techniques for efficiently coding and constructing reference picture lists for a generalized P/B (GPB) frame. In general, a reference picture list may be alternatively referred to as a reference frame list. As shown in FIG. 1, system 10 includes a source device 12 that transmits encoded video to a destination device 14 via a communication channel 16. Source device 12 and destination device 14 may comprise any of a wide range of devices. In some cases, source device 12 and destination device 14 may comprise wireless communication devices that can communicate video information over a communication channel 16, in which case communication channel 16 is wireless.

The techniques of this disclosure, however, which concern efficient coding and construction of reference picture lists for GPB frames, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data, and devices 12, 14 may comprise any of a variety of wired or wireless media devices such as mobile telephones, smartphones, digital media players, set-top boxes, televisions, displays, desktop computers, portable computers, tablet computers, gaming consoles, portable gaming devices, or the like.

In the example of FIG. 1, source device 12 includes a video source 18, video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera, a video storage archive, a computer graphics source, or the like. Likewise, destination device 14 may interface with an external display device, rather than including an integrated display device.

The illustrated system 10 of FIG. 1 is merely one example. Techniques for efficient coding and construction of reference picture lists for GPB frames may be performed by any digital video encoding and/or decoding device. The techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 includes video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

In accordance with this disclosure, video encoder 20 of source device 12 may be configured to apply the techniques for reducing a cost of signaling numbers of reference pictures and reference picture list construction commands for GPB frames. Video encoder 20 may encode a video frame as a GPB frame with respect to reference pictures in at least one of a first reference picture list and a second reference picture list that are identical. Video encoder 20 may also encoded syntax elements indicating that the video frame is coded as the GPB frame. For a GPB frame with identical reference picture lists, signaling a number of reference pictures and construction commands for both the first and second reference picture lists may be redundant. In the case of a GPB frame, therefore, video encoder 20 may encode syntax elements indicating a number of reference pictures and reference picture list construction commands for only the first reference picture list. In this way, the techniques eliminate redundant syntax elements indicating numbers of reference pictures and reference picture list construction commands in slice header syntax of the GPB frame by only encoding the syntax elements for the first reference picture list.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of prediction units (PUs), coding units (CUs) or other units of coded video, e.g., video slices, video frames, and video sequences or groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with this disclosure, video decoder 30 of destination device 14 may be configured to apply the techniques for reducing a cost of constructing reference picture lists for GPB frames. Video decoder 30 may decode syntax elements included with a coded video frame to determine that the video frame is coded as a GPB frame. Based on this indication, video decoder 30 expects to receive and decode syntax elements that indicate a number of reference pictures and reference picture list construction commands for only the first reference picture list. Video decoder 30 may then construct the first reference picture list based on the number of reference pictures and reference picture list construction commands indicated by the syntax elements.

Video decoder 30 then creates the second reference picture list as a duplicate of the first reference syntax elements picture list. In this way, a number of reference pictures in the second reference picture list is set equal to the number of reference pictures in the first reference picture list. The techniques may avoid redundant decoding processes to construct the reference picture lists for the GPB frame at a video decoder by only constructing the first reference picture list, and then duplicating the first reference picture list as the second reference picture list.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The JCT-VC is working on development of the HEVC standard, sometimes referred to as the future H.265 standard. The HEVC standardization efforts are based on a model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM provides as many as thirty-three intra-prediction encoding modes.

The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

A CU that is not further split may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU.

The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector. Data for the CU defining the PU(s) may also describe, for example, partitioning of the CU into one or more PUs. Partitioning modes may differ between whether the CU is skip or direct mode encoded, intra-prediction mode encoded, or inter-prediction mode encoded.

A CU having one or more PUs may also include one or more transform units (TUs). Following prediction using a PU, a video encoder may calculate residual values for the portion of the CU corresponding to the PU. The residual values correspond to pixel difference values that may be transformed into transform coefficients quantized, and scanned to produce serialized transform coefficients for entropy coding. A TU is not necessarily limited to the size of a PU. Thus, TUs may be larger or smaller than corresponding PUs for the same CU. In some examples, the maximum size of a TU may be the size of the corresponding CU. This disclosure uses the term "video block" to refer to any of a CU, PU, or TU.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence typically includes a series of video frames. A group of pictures (GOP) generally comprises a series of one or more video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a coding unit (CU) or a partition unit (PU) of the CU. The video blocks may have fixed or varying sizes, and may differ in size according to a specified coding standard. Each video frame may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding to produce a PU for a CU, video encoder 20 may calculate residual data to produce one or more transform units (TUs) for the CU. PUs of a CU may comprise pixel data in the spatial domain (also referred to as the pixel domain), while TUs of the CU may comprise coefficients in the transform domain, e.g., following application of a transform such as a discrete cosine transform (DCT), an integer transform, a wavelet transform, or a conceptually similar transform to residual video data. The residual data may correspond to pixel differences between pixels of the unencoded picture and prediction values of a PU of a CU. Video encoder 20 may form one or more TUs including the residual data for the CU. Video encoder 20 may then transform the TUs to produce transform coefficients.

Following any transforms to produce transform coefficients, quantization of transform coefficients may be performed. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), syntax-based context-adaptive binary arithmetic coding (SBAC), or another entropy encoding methodology.

To perform CABAC, video encoder 20 may select a context model to apply to a certain context to encode symbols to be transmitted. The context may relate to, for example, whether neighboring values are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on the context assigned to the symbols.

Video encoder 20 may also entropy encode syntax elements indicating numbers of reference pictures and reference picture list construction commands to enable video decoder 30 to reconstruct the reference picture lists used to encode CUs of a video frame. In accordance with this disclosure, video encoder 20 may reduce a cost of signaling numbers of reference pictures and reference picture list construction commands for GPB frames. Video encoder 20 may encode a video frame as a GPB frame with respect to reference pictures of at least one of a first reference picture list and a second reference picture list that are identical. For a GPB frame with identical reference picture lists, signaling both the first and second reference picture lists may be redundant. Video encoder 20, therefore, may encode syntax elements indicating that the video frame is encoded as the GPB frame, and syntax elements indicating a number of reference pictures and reference picture list construction commands for only the first reference picture list.

Video decoder 30 may operate in a manner essentially symmetrical to that of video encoder 20. For example, video decoder 30 may receive entropy encoded data representative of encoded CUs of a video frame. This received data may include syntax elements indicating that the video frame is coded as the GPB frame, and syntax elements indicating a number of reference pictures and reference picture list construction commands for only the first reference picture list. In accordance with this disclosure, video decoder 30 may reduce a cost of constructing reference picture lists for GPB frames. For example, video decoder 30 may determine that a video frame is encoded as a GPB frame, and expect to receive and decode the syntax elements that indicate the number of reference pictures and reference picture list construction commands for only the first reference picture list. Video decoder 30 may construct the first reference picture list based on the number of reference pictures and reference picture list construction commands indicated by the syntax elements. Video decoder 30 may then create the second reference picture list as a duplicate of the first reference picture list.

In this way, the techniques eliminate redundant syntax elements indicating numbers of reference pictures and reference picture list construction commands in slice header syntax of the GPB frame by only encoding the syntax elements for the first reference picture list. In addition, in some cases, the techniques may avoid redundant decoding processes to construct the reference picture lists for the GPB frame at a video decoder by only constructing the first reference picture list, and then duplicating the first reference picture list as the second reference picture list.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). An apparatus including video encoder 20 and/or video decoder 30 may comprise an integrated circuit, a microprocessor, and/or a wireless communication device, such as a cellular telephone.

Figure 2:
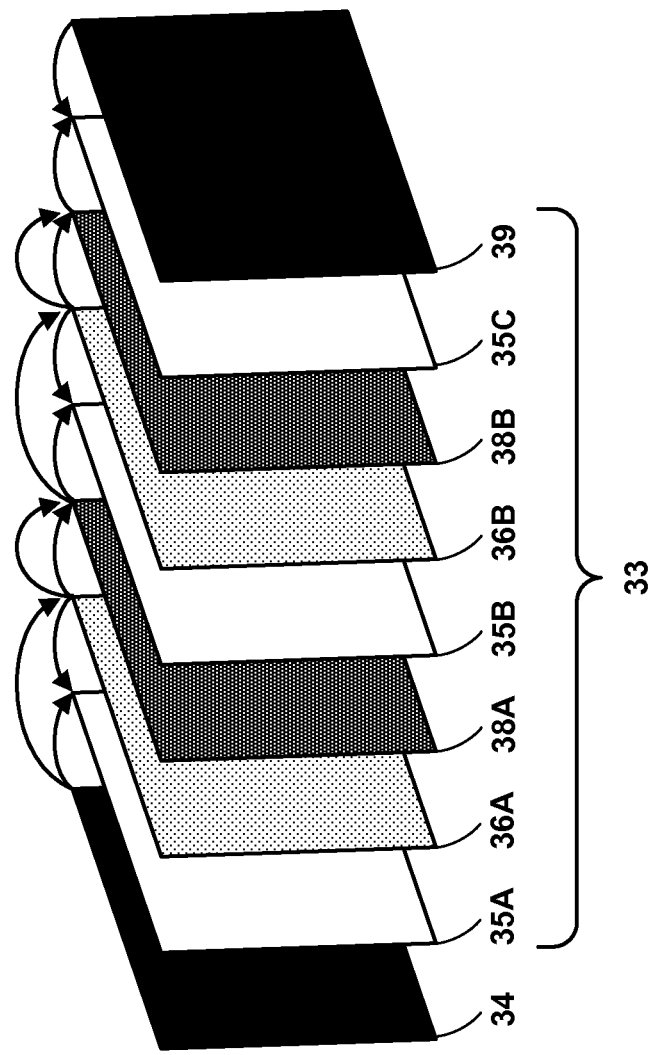
FIG. 2 is a conceptual diagram illustrating an example video sequence that includes GPB frames.

FIG. 2 is a conceptual diagram illustrating an example video sequence 33 that includes generalized P/B (GPB) frames 36A-36B and 38A-38B. In some cases, video sequence 33 may be referred to as a group of pictures (GOP). Video sequence 33, as illustrated, includes frames 35A, 36A, 38A, 35B, 36B, 38B, and 35C, and final frame 39 in display order. Frame 34 is a final frame in display order for a sequence occurring before sequence 33. FIG. 2 generally represents an exemplary prediction structure for a video sequence and is intended only to illustrate the frame references used for encoding different inter-mode frame types. An actual video sequence may contain more or fewer video frames of different frame types and in a different display order.

For block-based video coding, each of the video frames included in sequence 33 may be partitioned into video blocks or coding units (CUs). Each CU of a video frame may include one or more prediction units (PUs). Video blocks or PUs in an intra-coded (I) frame are encoded using spatial prediction with respect to neighboring blocks in the same frame. Video blocks or PUs in an inter-coded (P or B or GPB) frame may use spatial prediction with respect to neighboring blocks in the same frame or temporal prediction with respect to other reference pictures.

Video blocks in a B frame may be encoded using bidirectional prediction to calculate two motion vectors from two different reference picture lists, traditionally one past frame and one future frame. In some cases, video blocks in a B frame may be encoded using unidirectional prediction from one of the two different reference picture lists. Video blocks in a P frame may be encoded using unidirectional prediction to calculate a single motion vector from a single reference picture list, traditionally a past frame relative to the current frame in terms of display order. In accordance with the emerging HEVC standard, video blocks in a GPB frame may be encoded using either unidirectional prediction to calculate a single motion vector from one of two identical reference picture lists or bidirectional prediction to calculate two motion vectors from the two identical reference picture lists. The two identical reference picture lists may contain past reference pictures, for example.

In some cases, when a GPB frame is fully enabled for a given video slice, video frame, or video sequence, it may replace the standard P frame. In this case, all standard P frames may be treated as GPB frames such that a video encoder may determine to encode inter-mode frames as B frames or GPB frames. In other cases, when a GPB frame is partially enabled, all three inter-prediction modes may be used. In this case, a video encoder may determine to encode inter-mode frames as B frames, P frames or GPB frames.

In the example of FIG. 2, final frame 39 is designated for intra-mode coding as an I frame. In other examples, final frame 39 may be coded with inter-mode coding, e.g., as a P frame with reference to final frame 34 of the preceding sequence. Video frames 35A-35C (collectively "video frames 35") are designated for coding as B frames using bidirectional prediction with reference to a past frame and a future frame. In the illustrated example, frame 35A is encoded as a B frame with reference to final frame 34 and frame 36A, as indicated by the arrows from frame 34 and frame 36A to video frame 35A. Frames 35B and 35C are similarly encoded.

Video frames 36A-36B (collectively "video frames 36") may be designated for coding as either standard P frames or GPB frames using unidirectional prediction with reference to a past frame. In the illustrated example, frame 36A is encoded as a P frame or a GPB frame with reference to final frame 34, as indicated by the arrow from frame 34 to video frame 36A. Frame 36B is similarly encoded.

Video frames 38A-38B (collectively "video frames 38") may be designated for coding as GPB frames using bidirectional prediction with reference to the same past frame. In other examples, GPB frames may be encoded using bidirectional prediction with reference to substantially similar past frames included in the same reference picture list. In the illustrated example, frame 38A is encoded as a GPB frame with two references to frame 36A, as indicated by the two arrows from frame 36A to video frame 38A. Frame 38B is similarly encoded.

Figure 3:
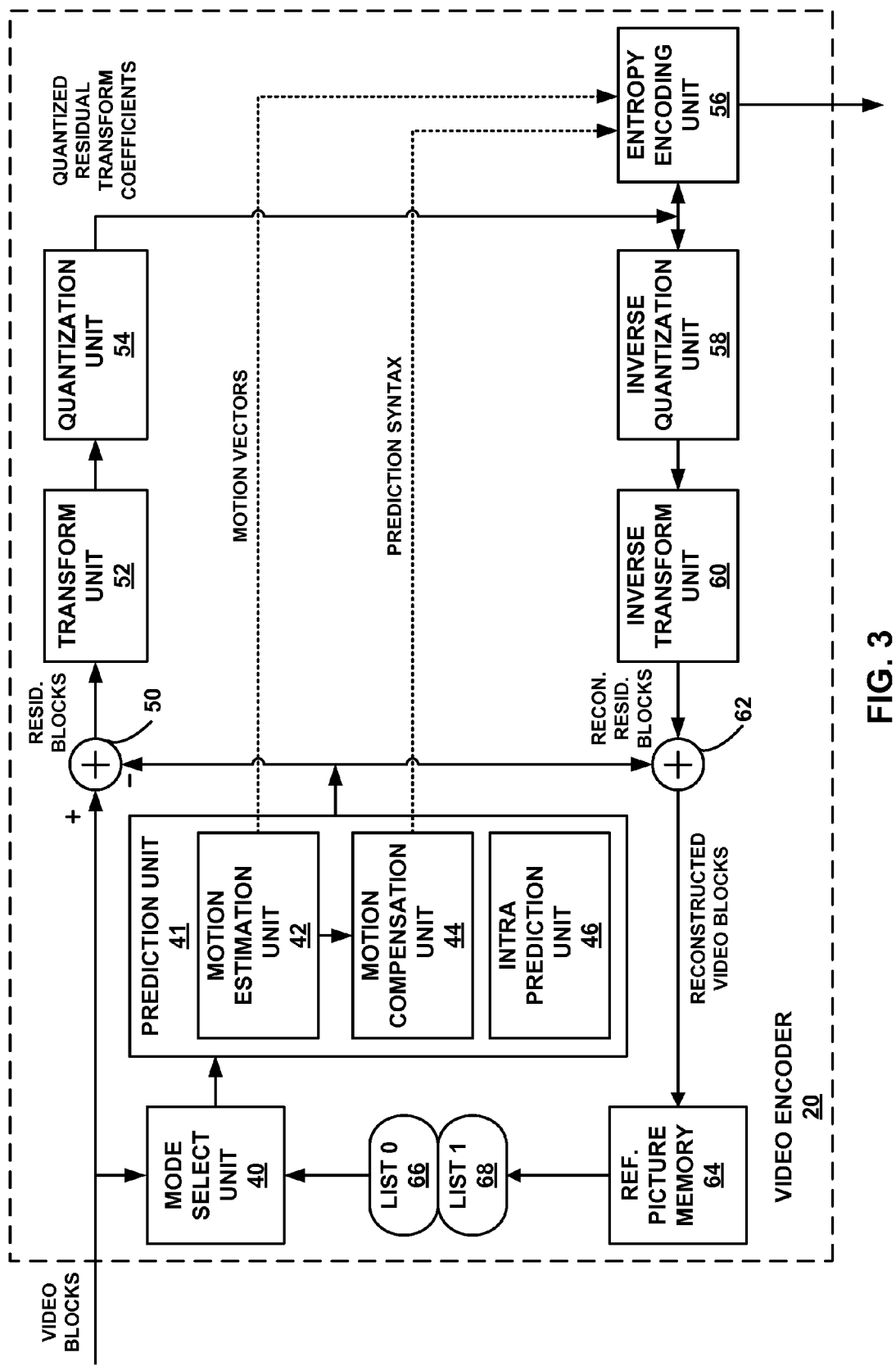
FIG. 3 is a block diagram illustrating an example video encoder that may implement techniques for efficiently signaling numbers of reference pictures and reference picture list construction commands for a GPB frame.

FIG. 3 is a block diagram illustrating an example of video encoder 20 that may implement techniques for efficiently signaling numbers of reference pictures and reference picture list construction commands for GPB frames. Video encoder 20 may perform intra- and inter-coding of coding units within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I mode) may refer to any of several spatial based compression modes. Inter-modes such as unidirectional prediction (P mode), bidirectional prediction (B mode), or generalized P/B prediction (GPB mode) may refer to any of several temporal-based compression modes.

In the example of FIG. 3, video encoder 20 includes mode select unit 40, prediction unit 41, reference picture memory 64, summer 50, transform unit 52, quantization unit 54, and entropy encoding unit 56. Prediction unit 41 includes motion estimation unit 42, motion compensation unit 44, and intra prediction unit 46. For video block reconstruction, video encoder 20 also includes inverse quantization unit 58, inverse transform unit 60, and summer 62. A deblocking filter (not shown in FIG. 3) may also be included to filter block boundaries to remove blockiness artifacts from reconstructed video. If desired, the deblocking filter would typically filter the output of summer 62.

As shown in FIG. 3, video encoder 20 receives a current video block within a video frame or slice to be encoded. The frame or slice may be divided into multiple video blocks or CUs. Mode select unit 40 may select one of the coding modes, intra or inter, for the current video block based on error results, and prediction unit 41 may provide the resulting intra- or inter-coded block to summer 50 to generate residual block data and to summer 62 to reconstruct the encoded block for use as a reference picture.

Intra prediction unit 46 within prediction unit 41 may perform intra-predictive coding of the current video block relative to one or more neighboring blocks in the same frame or slice as the current block to be coded to provide spatial compression. Motion estimation unit 42 and motion compensation unit 44 within prediction unit 41 perform inter-predictive coding of the current video block relative to one or more predictive blocks in one or more reference pictures to provide temporal compression. The one or more reference pictures may be selected from a first reference picture list (List 0) 66 and/or a second reference picture list (List 0) 68. List 0 66 and List 1 68 may be constructed based on decoded reference pictures stored in reference picture memory 64. In general, the reference picture lists may be alternatively referred to as reference frame lists.

Motion estimation unit 42 may be configured to determine the inter-prediction mode for a video frame according to a predetermined pattern for a video sequence. The predetermined pattern may designate video frames in the sequence as P frames and/or B frames. In some cases, a GPB frame may be enabled such that one or more video frames may be designated as GPB frames in the predetermined pattern. In other cases, when a GPB frame is enabled, motion estimation unit 42 may determine whether to encode originally designated P frames as GPB frames. The latter case may depend on whether the GPB frame is fully or partially enabled.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block or PU within a current video frame relative to a predictive block within a reference picture. A predictive block is a block that is found to closely match the video block or PU to be coded in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may calculate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a video block or PU of an inter-coded frame by comparing the position of the PU to the position of a predictive block of a reference picture in either List 0 66 or List 1 68. For example, when the inter-coded frame comprises a P frame, motion estimation unit 42 may use unidirectional prediction for a video block in the P frame and calculate a single motion vector from the one of List 0 66 and List 1 68 that includes identifiers for past frames, traditionally List 0 66.

When the inter-coded frame comprises a B frame, for example, List 0 66 and List 1 68 will include identifiers for different reference pictures, traditionally past frames and future frames. Motion estimation unit 42 may use bidirectional prediction for a video block of the B frame and calculate two motion vectors from List 0 66 and List 1 68. In some cases, motion estimation unit 42 may use unidirectional prediction for the video block of the B frame and calculate a single motion vector from one of reference picture lists 66, 68.

In accordance with the emerging HEVC standard, when the inter-coded frame comprises a GPB frame, List 0 66 and List 1 68 may include identical entries of identical reference pictures in the identical order. More specifically, the number of pictures included in each of List 0 66 and List 1 68 are identical, and a picture indicated by each index entry in List 0 66 is identical to the picture indicated by the same index entry in List 1 68. The reference pictures included in List 0 66 and List 1 68 may comprise past pictures. In this case, motion estimation unit 42 may use bidirectional predication for a video block of the GPB frame and calculate two motion vectors from list 0 66 and list 1 68. Motion estimation unit 42 may also use unidirectional prediction for the video block of the GPB frame and calculate a single motion vector from one of list 0 66 and list 1 68.

Motion estimation unit 42 sends the calculated motion vector to entropy encoding unit 56 and motion compensation unit 44. Motion compensation, performed by motion compensation unit 44, may involve fetching or generating the predictive block based on the motion vector determined by motion estimation. More specifically, in the case of an inter-predicted block, motion compensation unit 44 may construct List 0 66 and List 1 68 from decoded reference pictures stored in reference picture memory 64. Upon receiving the motion vector for the current video block or PU, motion compensation unit 44 may locate the predictive block to which the motion vector points in one of List 0 66 and List 1 68. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation.

Motion compensation unit 44 may also generate syntax elements defined to represent prediction information at one or more of a video sequence level, a video frame level, a video slice level, a video coding unit level, or a video prediction unit level. For example, motion compensation unit 44 may generate syntax elements that indicate List 0 66 and/or List 1 68 at a video slice level or a video frame level. The syntax elements may enable video decoder 30 to reconstruct the reference picture lists, List 0 66 and/or List 1 68, in order to decode encoded video blocks or CUs. Entropy encoding unit 56 may then encode the syntax elements and signal the syntax elements to video decoder 30.

The syntax elements for each reference picture list include syntax elements defined to represent a number of reference pictures in the reference picture list, and syntax elements defined to represent reference picture construction commands for the reference picture list. The syntax elements representing reference picture list construction commands may comprise commands that instruct decoder 30 how to initialize the reference picture list, and a table that instructs decoder 30 how to reorder the reference pictures of the reference picture list. In some examples, the syntax elements may also include syntax elements defined to represent prediction weights and offsets applied to reference pictures in the reference picture list. The syntax elements representing prediction weights and offsets may comprise a table that instructs decoder 30 to apply certain weight and offset values to each reference picture of the associated reference picture list. In some cases, the prediction weight and offset table may provide different weights and offset for luma and chroma portions of the reference pictures.

In accordance with the techniques of this disclosure, video encoder 20 may reduce a cost of signaling numbers of reference pictures and reference picture list construction commands for GPB frames. Video encoder 20 may encode a video frame as a GPB frame with respect to reference pictures of List 0 66 and/or List 1 68, which are identical. The techniques allow video encoder 20 to encode syntax elements indicating that the video frame is encoded as the GPB frame. In that case, it may be redundant for video encoder 20 to signal both List 0 66 and List 1 68. The techniques described in this disclosure, therefore, allow video encoder 20 to encode syntax elements indicating a number of reference pictures and reference picture list construction commands for only the first reference picture list, i.e., List 0 66, when a video frame is encoded as a GPB frame with identical reference picture lists. In this way, video encoder 20 may eliminate redundant syntax elements indicating numbers of reference pictures and reference picture list construction commands in slice header syntax of the GPB frame by only encoding the syntax elements for List 0 66. In other examples, video encoder 20 may encode syntax elements indicating reference picture list construction commands for only the second reference picture list, i.e., List 1 68.

The techniques described in this disclosure enable video encoder 20 to encode video blocks or CUs of GPB frames with respect to reference pictures in one or both of the identical reference picture lists, List 0 66 and List 1 68. For example, when motion estimation unit 42 uses bidirectional prediction for the video block of the GPB frame and calculates two motion vectors from List 0 66 and List 1 68, video encoder 20 may still encode the first motion vector with respect to reference pictures of List 0 66 and the second motion vector with respect to reference pictures of List 1 68. The techniques, however, are directed at modifying the signaling used by video encoder 20 to inform video decoder 30 of the reference picture lists. More specifically, motion compensation unit 44 may only generate syntax elements indicating a number of reference pictures and reference picture list construction commands for List 0 66.

When the first and second reference picture lists, List 0 66 and List 1 68, contain identifiers for identical reference pictures, it may be redundant to signal both the reference picture lists. According to the techniques, video encoder 20 may reduce the amount of signaling required at the video slice or frame level by eliminating the syntax elements that represent a number of reference pictures and reference picture list construction commands for the second reference picture list, i.e., List 1 68. By eliminating the syntax elements for the second reference picture list, including the reference picture list modification table, video encoder 20 may provide a substantial bit savings at the video slice or frame level.

In some examples, video encoder 20 may only encode syntax elements indicating prediction weights and offsets for the first reference picture list. In that case, the same weight and offset values are applied to reference pictures in the identical first and second reference frame lists. In other examples, video encoder 20 may encode separate syntax elements indicating different prediction weights and offsets for each of the first and second reference picture lists. In this case, different weight and offset values may be applied to reference frames in each of the identical first and second reference frame lists.

The techniques of this disclosure also include encoding syntax elements indicating that the video frame is encoded as a GPB frame. The syntax elements explicitly inform video decoder 30 that the video frame is encoded as the GPB frame. In this way, video decoder 30 expects that the syntax elements only include reference picture list construction commands for List 0 66. For example, if a GPB frame is enabled or allowed for a current video frame, video encoder 20 may signal a GPB enable flag to video decoder 30 to indicate that the GPB frame is enabled. Video encoder 20 may signal the GPB enable flag in syntax at either the video frame level or the video sequence level. The GPB enable flag may be defined to indicate that the GPB frame is disabled, fully enabled, or partially enabled. When the GPB frame is disabled, originally designated P frames are encoded as conventional P frames with one motion vector for each PU. When the GPB frame is fully enabled, originally designated P frames may be treated as GPB frames with one or two motion vectors for each PU. When the GPB frame is partially enabled, the P frame, B frame, and GPB frame concepts may be treated as distinct concepts.

In some examples, when a GPB frame is enabled, a new slice type may be defined such that a video frame may be encoded with a GPB slice type. In this case, the GPB slice type explicitly informs video decoder 30 that the video frame is encoded as a GPB frame. In other examples, although the GPB frame is enabled, a new slice type may not be defined such that a video frame may be encoded with a B slice type and/or a P slice type. In this case, video encoder 20 may need to also encode a GPB flag along with the B slice type and/or P slice type to video decoder 30 to differentiate between standard B and/or P frames and GPB frames. In any case, the syntax elements explicitly inform video decoder 30 that the video frame is encoded as the GPB frame. In this way, video decoder 30 knows that the syntax elements include reference picture list construction commands for only List 0 66, which may enable video decoder 30 to properly parse the syntax elements.

As one example, when the GPB frame is enabled, a new GPB slice type may be defined. An exemplary definition table for the syntax element, slice_type, defined to represent the type of slice used to encode a video frame is presented in Table 1 below. In the exemplary definition table, the slice_type syntax element is defined to indicate the new GPB slice type when set equal to a value of 5. In other examples, the GPB slice type may be associated with any other number not already associated with a different slice type.

TABLE 1

| slice_type | Name of slice_type |
|---|---|
| 0 | P (P slice) |
| 1 | B (B slice) |
| 2 | I (I slice) |
| 3 | SP (SP slice) |
| 4 | SI (SI slice) |
| 5 | GPB (GPB slice) |

When the new GPB slice type is defined, no additional explicit signaling is necessary to indicate that the current video frame is encoded as a GPB frame. When the video frame is encoded as a GPB slice, the slice header syntax may define a number of reference pictures and reference picture list construction commands for only a first reference picture list, i.e., List 0 66. An excerpt from the syntax at the video slice level is presented in Table 2 below with modifications to only encode a syntax element, num_ref_idx_l0_active_minus1, indicating a number of active reference pictures for List 0 66 for a video frame encoded as a GPB slice.

TABLE 2

| slice_header( ) { | C | Descriptor |
|---|---|---|
| ... | | |
| if( slice_type = = P \|\| slice_type = = GPB \|\| slice_type = = B ) { | | |
|   num_ref_idx_active_override_flag | 2 | u(1) |
|   if( num_ref_idx_active_override_flag ) { | | |
|     num_ref_idx_l0_active_minus1 | 2 | ue(v) |
|     if( slice_type = = B ) | | |
|       num_ref_idx_l1_active_minus1 | 2 | ue(v) |
|   } | | |
| } | | |
| ref_pic_list_modification( ) | | |
| ... | | |

The slice header syntax is defined for a given video frame. The C column in Table 2 indicates a category for each syntax element that defines in which data partition of the current video frame the syntax element is included. The Descriptor column in Table 2 indicates a type of coding used for the syntax element to enable proper parsing of the syntax element at video decoder 30. For example, the descriptor "ue(v)" indicates exponential-Golomb coding.

As shown in the syntax excerpt of Table 2, if the current video frame is considered a P slice, GPB slice, or a B slice, motion compensation unit 44 generates a syntax element, num_ref_idx_l0_active_minus11, to represent a number of active reference pictures included in List 0 66. Then, only if the video frame is considered a B slice, motion compensation unit 44 generates a syntax element num_ref_idx_l1_active_minus1, to represent a number of reference pictures included in List 1 68.

When the video frame is considered a GPB slice, the number of active reference pictures is only signaled for List 0 66, and the number of active reference pictures for List 1 68 is set equal to the same value as that for List 0 66. In some cases, reference pictures may be added into a list, but never used because the reference pictures are placed at reference index positions that exceed the indicated number of active reference pictures for that list. The actual usable number of reference pictures in a list, therefore, may be considered equal to the indicated number of active reference pictures for the list. In this disclosure, the terms "number of reference pictures" and "number of active reference pictures" may be considered to be equivalent and used interchangeably.

As another example, when the GPB frame is enabled, a video frame may be encoded as a B slice with either different reference picture lists in the case of conventional B frames, or identical reference picture lists in the case of GPB frames. This mode of encoding GPB frames may be preferable when the GPB frame is fully enabled such that all inter-predictive frames may be encoded as B slices with or without identical reference picture lists. Video encoder 20 may explicitly signal a GPB flag, e.g., gpb_pred_flag or slice_gpb_flag, to video decoder 30 to indicate when the video frame is encoded as a GPB frame in order to distinguish between a conventional B frame and a GPB frame. Video encoder 20 may signal the GPB flag in the syntax at one of the video slice level, the video frame level, or the video sequence level.

When the video frame is encoded as a B slice type with a GPB flag, the slice header syntax may define a number of reference pictures and reference picture list construction commands for only a first reference picture list, i.e., List 0 66. An excerpt from the syntax at the video slice level is presented in Table 3 below with modifications to only encode a syntax element, num_ref_idx_l0_active_minus1, indicating a number of active reference pictures for List 0 66 for a video frame encoded as a B slice with a GPB flag, slice_gpb_flag.

TABLE 3

| slice_header( ) { | C | Descriptor |
|---|---|---|
| ... | | |
| if ( slice_type = = B ) | | |
|   slice_gpb_flag | 1 | u(l) |
| if( slice_type = = P || slice_type = = B ) { | | |
|   num_ref_idx_active_override_flag | 2 | u(l) |
|   if( num_ref_idx_active_override_flag ) { | | |
|     num_ref_idx_l0_active_minus1 | 2 | ue(v) |
|     if( slice_type = = B && !slice_gpb_flag) | | |
|       num_ref_idx_l1_active_minus1 | 2 | ue(v) |
|   } | | |
| } | | |
| ref_pic_list_modification( ) | | |
| ... | | |

As shown in the syntax excerpt of Table 3, if the current video frame is considered a B slice, video encoder 20 may signal the GPB flag, slice_gpb_flag, to indicate that the video frame is encoded as a GPB frame with respect to reference pictures of identical reference picture lists. If the video frame is encoded as a conventional B frame with respect to reference pictures of different reference picture lists, video encoder 20 may not signal the GPB flag.

If the current video frame is considered a P slice or a B slice, with or without the GPB flag, motion compensation unit 44 generates a syntax element, num_ref_idx_l0_active_minus1, to represent a number of active reference pictures included in List 0 66. Then, only if the video frame is considered a B slice without the GPB flag, i.e., a conventional B slice, motion compensation unit 44 generates a syntax element num_ref_idx_l1_active_minus1, to represent a number of reference pictures included in List 1 68. When the video frame is considered a B slice with the GPB flag, the number of active reference pictures is only signaled for List 0 66, and the number of active reference pictures for List 1 68 is set equal to the same value as that for List 0 66.

In a further example, when the GPB frame is enabled, a video frame may be encoded as a P slice with the option of bidirectional prediction in the case of GPB frames. This mode of encoding GPB frames may be preferable when the GPB frame is partially enabled such that inter-predictive frames may be encoded as B slices or P slices with or without bidirectional prediction. Video encoder 20 may explicitly signal a GPB flag, e.g., gpb_pred_flag or slice_gpb_flag, to video decoder 30 to indicate when the video frame is encoded as a GPB frame in order to distinguish between a conventional P frame and a GPB frame. Video encoder 20 may signal the GPB flag in the syntax at one of the video slice level, the video frame level, or the video sequence level.

When the video frame is encoded as a P slice type with a GPB flag, the slice header syntax may define a number of reference pictures and reference picture list construction commands for only a first reference picture list, i.e., List 0 66. An excerpt from the syntax at the video slice level is presented in Table 4 below with modifications to only encode a syntax element, num_ref_idx_l0_active_minus1, indicating a number of active reference pictures for List 0 66 for a video frame encoded as a P slice with a GPB flag, slice_gpb_flag.

TABLE 4

| slice_header( ) { | C | Descriptor |
|---|---|---|
| ... | | |
| if ( slice_type = = P ) | | |
|   slice_gpb_flag | 1 | u(l) |
| if( slice_type = = P || slice_type = = B ) { | | |
|   num_ref_idx_active_override_flag | 2 | u(l) |
|   if( num_ref_idx_active_override_flag ) { | | |
|     num_ref_idx_l0_active_minus1 | 2 | ue(v) |
|     if( slice_type = = B ) | | |
|       num_ref_idx_l1_active_minus1 | 2 | ue(v) |
|   } | | |
| } | | |
| ref_pic_list_modification( ) | | |
| ... | | |

As shown in the syntax excerpt of Table 4, if the current video frame is considered a P slice, video encoder 20 may signal the GPB flag, slice_gpb_flag, to indicate that the video frame is encoded as a GPB frame with the option of either unidirectional or bidirectional prediction. If the video frame is encoded as a conventional P frame with only unidirectional prediction, video encode 20 may not signal the GPB flag.

If the current video frame is considered a P slice, with or without the GPB flag, or a B slice, motion compensation unit 44 generates a syntax element, num_ref_idx_l0_active_minus1, to represent a number of active reference pictures included in List 0 66. Then, only if the video frame is considered a B slice, motion compensation unit 44 generates a syntax element num_ref_idx_l1_active_minus1, to represent a number of reference pictures included in List 1 68. When the video frame is considered a P slice with the GPB flag, the number of active reference pictures is only signaled for List 0 66, the number of active reference pictures for List 1 68 is set equal to the same value as that for List 0 66.

In any of the above examples, when the video frame is encoded as a GPB frame, motion compensation unit 44 also generates syntax elements defined to represent reference picture list construction commands, including reference picture reordering, for reference pictures within List 0 66 according to the reference picture list modification table, ref_pic_list_modification( ), described in more detail below with respect to Table 5. The syntax elements representing reference picture list reordering may comprise a table that instructs decoder 30 how to reorder the reference pictures of the first reference picture list, List 0 66. The syntax for the reference picture list modification table is presented in Table 5 below with modifications to only encode reference picture list construction commands for List 0 66 for a video frame encoded as a GPB frame.

TABLE 5

| ref_pic_list_modification( ) { | C | Descriptor |
|---|---|---|
| if( slice_type % 5 != 2 ) { // inter-mode slice type |  |  |
|   ref_pic_list_modification_flag_l0 | 2 | u(1) |
|   if( ref_pic_list_modification_flag_l0 ) |  |  |
|     do { |  |  |
|       modification_of_pic_nums_idc | 2 | u(1) |
|       if(modification_of_pic_nums_idc = = 0 \|\| |  |  |
|          modification_of_pic_nums_idc = = 1 ) |  |  |
|         abs_diff_pic_num_minus1 | 2 | ue(v) |
|       else ( modification_of_pic_nums_idc = = 2 ) |  |  |
|         long_term_pic_num | 2 | ue(v) |
|     } while( modification_of_pic_nums_idc != 3 ) |  |  |
| } |  |  |
| if( slice_type % 5 = = 1 && !slice_gbp_flag ) { |  |  |
| // conventional B slice type |  |  |
|   ref_pic_list_modification_flag_l1 | 2 | u(1) |
|   if( ref_pic_list_modification_flag_l1 ) |  |  |
|     do { |  |  |
|       modification_of_pic_nums_idc | 2 | u(1) |
|       if(modification_of_pic_nums_idc = = 0 \|\| |  |  |
|          modification_of_pic_nums_idc = = 1 ) |  |  |
|         abs_diff_pic_num_minus1 | 2 | ue(v) |
|       else if( modification_of_pic_nums_idc = = 2 ) |  |  |
|         long_term_pic_num | 2 | ue(v) |
|     } while( modification_of_pic_nums_idc != 3 ) |  |  |
| } |  |  |
| } |  |  |

As shown in the syntax excerpt of Table 5, if the current video frame is considered an inter-mode slice, i.e., B slice, P slice, or GPB slice, video encoder 20 may signal the modification flag, ref_pic_list_modification_flag_l0, to indicate that the reference pictures of the first reference picture list, List 0 66, are reordered. If the video frame is considered a conventional B slice, video encoder 20 may also signal the modification flag, ref_pic_list_modification_flag_l1, to indicate that the reference pictures of the second reference picture list, List 1 68, are reordered.

If the reference pictures of the List 0 66 are reordered, motion compensation unit 44 generates syntax elements that indicate how the reference pictures of the first reference picture list, List 0 66, are reordered. The syntax elements may define whether the reordered reference picture lists are short term reference pictures of List 0 66, long term reference picture of List 0 66, and how the reference pictures are reordered. For example, the syntax elements may define an offset from the frame of the predictive block in the case of short term reference picture reordering, and may assign a new index number to the frame in the case of long term reference picture reordering. Motion compensation unit 44 generates similar syntax elements for the second reference picture list, List 1 68, only when the video frame is encoded as a conventional B slice and the reference pictures of List 1 68 are reordered.

In some cases, when the video frame is encoded as a GPB frame, motion compensation unit 44 may also generate syntax elements defined to represent prediction weight and offset values applied to reference pictures within List 0 66 and/or List 1 68 according to a prediction weight and offset table, pred_weight_table( ) described in more detail below with respect to Table 6. The syntax elements representing prediction weights and offsets may comprise a table that instructs decoder 30 to apply certain weight and offset values to each reference picture of the associated reference picture list. The syntax for the prediction weight and offset table is presented in Table 6 below with modifications to only encode prediction weight and offset values for List 0 66 and/or List 1 68 for a video frame encoded as a GPB frame.

TABLE 6

| pred_weight_table( ) { | C | Descriptor |
|---|---|---|
| luma_log2_weight_denom | 2 | ue(v) |
| if( ChromaArrayType != 0 ) |  |  |
|   chroma_log2_weight_denom | 2 | ue(v) |
| for( i = 0; i <= num_ref_idx_l0_active_minus1; i++ ) { |  |  |
|   luma_weight_l0_flag | 2 | u(1) |
|   if( luma_weight_l0_flag ) { |  |  |
|     luma_weight_l0[ i ] | 2 | se(v) |
|     luma_offset_l0[ i ] | 2 | se(v) |
|   } |  |  |
|   if ( ChromaArrayType != 0 ) { |  |  |
|     chroma_weight_l0_flag | 2 | u(1) |
|     if( chroma_weight_l0_flag ) |  |  |
|       for( j =0; j < 2; j++ ) { |  |  |
|         chroma_weight_l0[ i ][ j ] | 2 | se(v) |
|         chroma_offset_l0[ i ][ j ] | 2 | se(v) |
|       } |  |  |
|   } |  |  |
| } |  |  |
| if( slice_type % 5 = = 1 && !slice_gbp_flag ) { |  |  |
| // conventional B slice type |  |  |
|   for( i = 0; i <= num_ref_idx_l1_active_minus1; i++ ) { |  |  |
|     luma_weight_l1_flag | 2 | u(1) |
|     if( luma_weight_l1_flag ) { |  |  |
|       luma_weight_l1[ i ] | 2 | se(v) |
|       luma_offset_l1[ i ] | 2 | se(v) |
|     } |  |  |
|     if( ChromaArrayType != 0 ) { |  |  |
|       chroma_weight_l1_flag | 2 | u(1) |
|       if( chroma_weight_l1_flag ) |  |  |
|         for( j = 0; j < 2; j++ ) { |  |  |
|           chroma_weight_l1[ i ][ j ] | 2 | se(v) |
|           chroma_offset_l1[ i ][ j ] | 2 | se(v) |
|         } |  |  |
|     } |  |  |
|   } |  |  |
| } |  |  |

As shown in the syntax excerpt of Table 6, if the current video frame is considered an inter-mode slice, i.e., B slice, P slice, or GPB slice, motion compensation unit 44 generates syntax elements that indicate the prediction weight and offset values applied to each of the reference pictures of the first reference picture list, List 0 66. The syntax elements may define separate prediction weights and offsets for the luma and chroma portions of the reference pictures of List 0 66. In some examples, motion compensation unit 44 may only encode syntax elements indicating prediction weights and offsets for List 0 66. In that case, the same weight and offset values are applied to the identical reference pictures in List 0 66 and List 1 68. In other examples, video encoder 20 may encode separate syntax elements indicating different prediction weights and offsets for each of List 0 66 and List 1 68. In this case, different weight and offset values may be applied to the identical reference frames in each of List 0 66 and List 1 68.

After motion compensation unit 44 generates the predictive block for the current video block, video encoder 20 forms a residual video block by subtracting the predictive block from the current video block. Transform unit 52 may form one or more transform units (TUs) from the residual block. Transform unit 52 applies a transform, such as a discrete cosine transform (DCT) or a conceptually similar transform, to the TU, producing a video block comprising residual transform coefficients. The transform may convert the residual block from a pixel domain to a transform domain, such as a frequency domain.

Transform unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), or another entropy encoding technique. Following the entropy encoding by entropy encoding unit 56, the encoded bitstream may be transmitted to a video decoder, such as video decoder 30, or archived for later transmission or retrieval.

Entropy encoding unit 56 may also entropy encode the motion vectors and the other prediction syntax elements for the current video frame being coded. For example, entropy encoding unit 56 may construct header information that includes appropriate syntax elements generated by motion compensation unit 44 for transmission in the encoded bitstream. At the video slice level, the syntax elements may include reference picture list construction commands for List 0 66 and/or List 1 68. At the video slice level or higher levels, the syntax elements may indicate whether a GPB frame is enabled for a given video frame, and whether the given video frame is encoded as the GPB frame. Video decoder 30 may use these syntax elements to construct the reference picture lists and reconstruct the original video blocks encoded by video encoder 20.

To entropy encode the syntax elements, entropy encoding unit 56 may perform CABAC and binarize the syntax elements into one or more binary bits based on a context model. Entropy encoding unit may also perform CAVLC and encode the syntax elements as codewords according to probabilities based on context.

Inverse quantization unit 58 and inverse transform unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within List 0 66 or List 1 68. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in reference picture memory 64. The reference block may be used by motion estimation unit 42 and motion compensation unit 44 as a reference block to inter-predict a block in a subsequent video frame.

Figure 4:
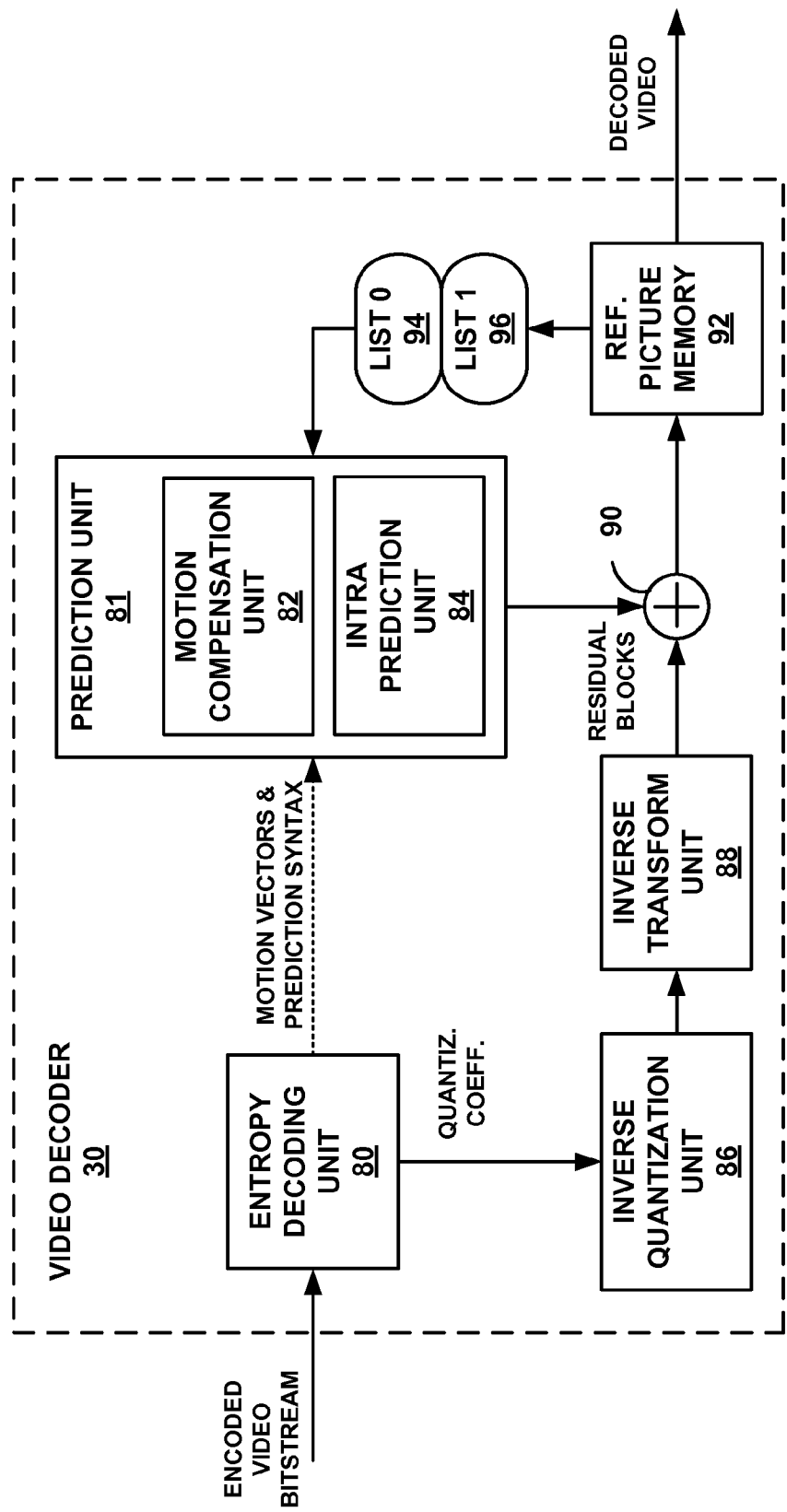
FIG. 4 is a block diagram illustrating an example video decoder that may implement techniques for efficiently constructing reference picture lists for a GPB frame.

FIG. 4 is a block diagram illustrating an example video decoder that may implement techniques for efficiently constructing reference picture lists for a GPB frame. In the example of FIG. 4, video decoder 30 includes an entropy decoding unit 80, prediction unit 81, inverse quantization unit 86, inverse transformation unit 88, summer 90, and reference picture memory 92. Prediction unit 81 includes motion compensation unit 82 and intra prediction unit 84. Video decoder 30 may, in some examples, perform a decoding pass generally reciprocal to the encoding pass described with respect to video encoder 20 (FIG. 3).

During the decoding process, video decoder 30 receives an encoded video bitstream that includes an encoded video frame and syntax elements that represent coding information from a video encoder, such as video encoder 20. Entropy decoding unit 80 of video decoder 30 entropy decodes the bitstream to generate quantized coefficients, motion vectors, and other prediction syntax. Entropy decoding unit 80 forwards the motion vectors and other prediction syntax to prediction unit 81. Video decoder 30 may receive the syntax elements at the video prediction unit level, the video coding unit level, the video slice level, the video frame level, and/or the video sequence level.

When the video frame is coded as an intra-coded (I) frame, intra prediction unit 84 of prediction unit 81 may generate prediction data for a video block of the current video frame based on a signaled intra prediction mode and data from previously decoded blocks of the current frame. When the video frame is coded as an inter-coded (i.e., B, P or GPB frame), motion compensation unit 82 of prediction unit 81 produces predictive blocks for a video block of the current video frame based on the motion vectors and prediction syntax received from entropy decoding unit 80. The predictive blocks may be produced from one or more of a first reference picture list (List 0) 94 and a second reference picture list (List 1) 96. List 0 94 and List 1 96 may be constructed based on reference pictures stored in reference picture memory 92.

Motion compensation unit 82 determines prediction information for the current video block by parsing the motion vectors and prediction syntax, and uses the prediction information to produce the predictive blocks for the current video block being decoded. For example, motion compensation unit 82 uses some of the received syntax elements to determine sizes of CUs used to encode the current frame, split information that describes how each CU of the frame is split, modes indicating how each split is encoded (e.g., intra- or inter-prediction), an inter-prediction slice type (e.g., B slice, P slice, or GPB slice), reference picture list construction commands for one or more reference picture lists for the frame, motion vectors for each inter-encoded video block of the frame, motion prediction direction for each inter-encoded video block of the frame, and other information to decode the current video frame.

Motion compensation unit 82 may also perform interpolation based on interpolation filters. Motion compensation unit 82 may use interpolation filters as used by video encoder 20 during encoding of the video block to calculate interpolated values for sub-integer pixels of a reference block. Motion compensation unit 82 may determine the interpolation filters used by video encoder 20 from the received syntax elements and use the interpolation filters to produce predictive blocks. In accordance with the techniques of this disclosure, video decoder 30 may reduce a cost of constructing reference picture lists for GPB frames. For example, video decoder 30 may decode syntax elements included with the encoded video frame to determine that the current video frame is encoded as a GPB frame. Video decoder 30 may also decode syntax elements that indicate a number of reference pictures and reference picture list construction commands for only the first reference picture list, i.e., List 0 94. Video decoder 30 may construct the first reference picture list, List 0 94 based on the reference picture list construction commands indicated by the syntax elements. Video decoder 30 may then create the second reference picture list, List 1 96, as a duplicate of List 0 94, by setting a number of reference pictures for List 1 96 equal to the number of reference pictures for List 0 94 and duplicating each reference picture index in List 0 94 into List 1 96.

Motion compensation unit 82 may parse the syntax at the video slice level or the video frame level to determine reference picture list construction commands for the current video frame. According to the techniques, when the current video frame is encoded as a GPB frame with identical reference picture lists, video decoder 30 may expect to receive and decode reference list syntax elements indicating a number of reference pictures and reference picture list construction commands for only the first reference picture list, List 0 94. Video decoder 30 may then construct the first reference picture list, List 0 94, and duplicate the first reference picture list to create the second reference picture list, List 1 96.

In order to construct the first reference picture list, video decoder 30 performs reference picture list initialization and reference picture list reordering (i.e., modification) for the first reference picture list using the syntax elements indicating reference picture list construction commands for the first reference picture list. In one example, video decoder 30 may perform the reference picture list initialization of List 0 94 for the GPB frame according to the conventional process for a P frame. More specifically, video decoder 30 may initialize the first reference picture list, List 0 94, by placing the reference pictures into an initialization list based on a descending decoding order, or frame number, of the reference pictures. In another example, video decoder 30 may perform the reference picture list initialization of List 0 94 for the GPB frame according to the conventional process for List 0 of a B frame. More specifically, video decoder 30 may initialize the first reference picture list, List 0 94, by placing the reference pictures into an initialization list based on descending display order, or POC (picture order count) values, of the reference pictures.

Video decoder 30 may then perform reference picture list reordering for the first reference picture list using the syntax elements indicating reference picture list construction commands. The syntax elements representing reference picture list modification may comprise a table that instructs decoder 30 how to reorder the reference pictures of the first reference picture list. Video decoder 30 may modify a position of a reference picture placed in the initialization list during the reference picture list initialization step to any other position, and may place any reference picture stored in reference picture memory 92 into the initialization list at any position. If a reference picture is reordered to a position in the initialization list that exceeds the number of active reference pictures of the list, the reference picture may not be considered an active reference picture in the first reference picture list, List 0 94. As described above, video decoder 30 receives the number of active reference pictures for List 0 94 in the syntax elements from video encoder 20.

Video decoder 30 may also apply prediction weights and offsets to reference pictures in the first reference picture list using the syntax elements indicating weight and offset values of the reference pictures. The syntax elements representing prediction weights and offsets may comprise a table that instructs decoder 30 to apply certain weight and offset values to each reference picture of the first reference picture list. In some examples, video decoder 30 may only decode syntax elements indicating prediction weights and offsets for the first reference picture list. In that case, the same weight and offset values are applied to reference pictures in the identical first and second reference frame lists. In other examples, video decoder 30 may decode separate syntax elements indicating different prediction weights and offsets for each of the first and second reference picture lists. In this case, different weight and offset values may be applied to reference frames in each of the identical first and second reference frame lists.

After constructing the first reference picture list, List 0 94, for the GPB frame, video decoder 30 may create the second reference picture list, List 1 96, as a duplicate of List 0 94. More specifically, video decoder 30 may set a number of reference pictures for List 1 96 equal to the number of reference pictures for List 0 94, and duplicate each reference index in List 0 94 into List 1 96. In this way, List 0 94 and List 1 96 contain identifiers for identical reference pictures. More specifically, the number of pictures included in each of List 0 94 and List 1 96 are identical, and a picture indicated by each index entry in List 0 94 is identical to the picture indicated by the same index entry in List 1 96. Video decoder 30 may then decode the video frame as the GPB frame with respect to reference pictures in one or both of List 0 94 and List 1 96. According to the techniques, video decoder 30 reduces the cost of performing decoding processes by eliminating construction of the second reference picture list, List 1 96. By eliminating the construction of the second reference picture list, including the initialization and reordering of reference pictures in the list, video decoder 30 may provide a substantial savings in processing cost.

In addition, motion compensation unit 82 may parse the syntax at the video slice level, the video frame level, or the video sequence level to determine whether the current video frame is encoded as a GPB frame based on an explicitly signaled syntax elements, described with respect to FIG. 3. The syntax elements may be used to explicitly inform video decoder 30 that the current video frame is encoded as a GPB frame. In this way, video decoder 30 may expect to receive and decode the syntax elements indicating reference picture list construction commands for only the first reference picture list, List 0 94. The explicit signaling may enable video decoder 30 to properly parse the syntax elements.

For example, motion compensation unit 82 may determine that a GPB frame is enabled or allowed for the current video frame based on a GPB enable flag received in the syntax at either the video frame level or the video sequence level. The GPB enable flag, described in more detail with respect to FIG. 3, may be defined to indicate that the GPB frame is disabled, fully enabled, or partially enabled. When the GPB frame is enabled, motion compensation unit 82 may determine that a current frame is encoded as a GPB frame based on a slice type of the current video frame. In some cases, a new slice type may be defined such that a video frame may be encoded as a GPB slice type that explicitly informs video decoder 30 that the video frame is encoded as a GPB frame. In other cases, a new slice type may not be defined such that a video frame may be encoded as a B slice type and/or a P slice type with a GPB flag that explicitly informs video decoder 30 that the video frame is encoded as a GPB frame.

Inverse quantization unit 86 inverse quantizes, i.e., de-quantizes, the quantized transform coefficients provided in the bitstream and decoded by entropy decoding unit 80. The inverse quantization process may include use of a quantization parameter $QP_Y$ calculated by video encoder 20 for each video block or CU to determine a degree of quantization and, likewise, a degree of inverse quantization that should be applied. Inverse transform unit 88 applies an inverse transform, e.g., an inverse DCT, an inverse integer transform, or a conceptually similar inverse transform process, to the transform coefficients in order to produce residual blocks in the pixel domain.

After motion compensation unit 82 generates the predictive block for the current video block based on the motion vectors and prediction syntax elements, video decoder 30 forms a decoded video block by summing the residual blocks from inverse transform unit 88 with the corresponding predictive blocks generated by motion compensation unit 82. Summer 90 represents the component or components that perform this summation operation. If desired, a deblocking filter may also be applied to filter the decoded blocks in order to remove blockiness artifacts. The decoded video blocks are then stored in reference picture memory 92, which provides reference blocks of reference pictures for subsequent motion compensation. Reference picture memory 92 also produces decoded video for presentation on a display device, such as display device 32 of FIG. 1.

Figure 5:
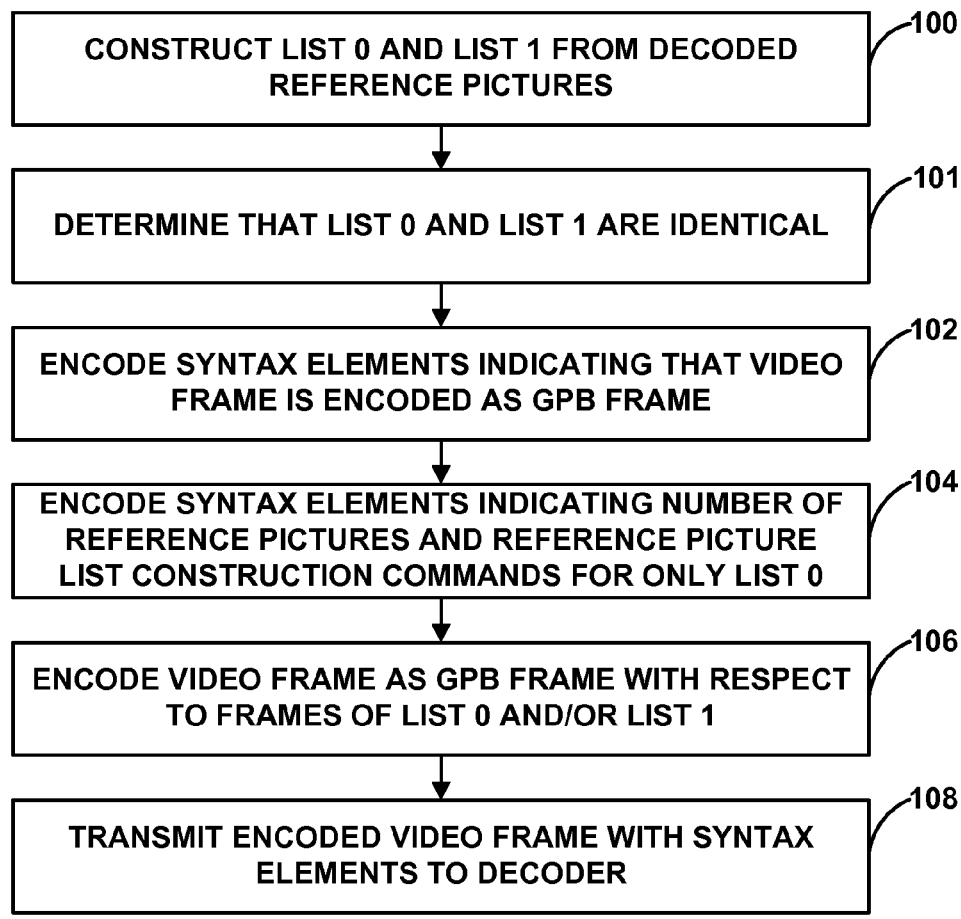
FIG. 5 is a flowchart illustrating an example operation of encoding a number of reference pictures and reference picture list construction commands for only a first reference picture list.

FIG. 5 is a flowchart illustrating an example operation of encoding a number of reference pictures and reference picture list construction commands for only a first reference picture list. The illustrated operation is described with reference to video encoder 20 of FIG. 3.

Video encoder 20 receives video blocks or CUs of a current video frame to be encoded. When the current video frame is designated as a GPB frame, video encoder 20 constructs List 0 66 and List 1 68 based on decoded reference pictures stored in reference picture memory 64 (100). Video encoder 20 then determines that List 0 66 and List 1 68 are identical reference picture lists (101).

According to the techniques of this disclosure, video encoder 20 may then encode syntax elements indicating that the current video frame is encoded as a GPB frame (102). For example, if a GPB frame is enabled or allowed for a current video frame, video encoder 20 may signal a GPB enable flag to video decoder 30 to indicate that the GPB frame is enabled. As an example, when the GPB frame is enabled, video encoder 20 may explicitly inform video decoder 30 that the video frame is encoded as a GPB frame by encoding one of a GPB slice type, a P slice type with a GPB flag, or a B slice type with a GPB flag. In any case, the syntax elements explicitly inform video decoder 30 that the video frame is coded as the GPB frame.

In further accordance with the techniques, video encoder 20 then encodes syntax elements for the GPB frame indicating a number of reference pictures and reference picture list construction commands for only List 0 66 (104). For a GPB frame with identical reference picture lists, signaling construction commands for both the first and second reference picture lists may be redundant. The techniques enable video encoder 20 to reduce a cost of coding GPB frames. For example, video encoder 20 may encode syntax elements defined to represent a number of reference pictures included in List 0 66, and syntax elements defined to represent reference picture list construction commands for List 0 66. According to the techniques, video encoder 20 may not encode any syntax elements for the GPB frame indicating a number reference picture list construction commands for List 1 68.

Video encoder 20 may also encode syntax elements indicating prediction weight and offset values applied to reference pictures in List 0 66 and/or List 1 68. In some examples, video encoder 20 may only encode syntax elements indicating prediction weights and offsets for the first reference picture list. In that case, the same weight and offset values are applied to reference pictures in the identical first and second reference frame lists. In other examples, video encoder 20 may encode separate syntax elements indicating different prediction weights and offsets for each of the first and second reference picture lists. In this case, different weight and offset values may be applied to reference frames in each of the identical first and second reference frame lists.

Video encoder 20 may then encode the video frame as the GPB frame with respect to reference pictures of List 0 66 and/or List 1 68 (106). For example, video encoder 20 may encode the video frame as the GPB frame using unidirectional prediction from List 0 66, or using bidirectional prediction from both List 0 66 and List 1 68. Video encoder 20 may then transmit the encoded video frame along with the syntax elements to video decoder 30 (108).

Figure 6:
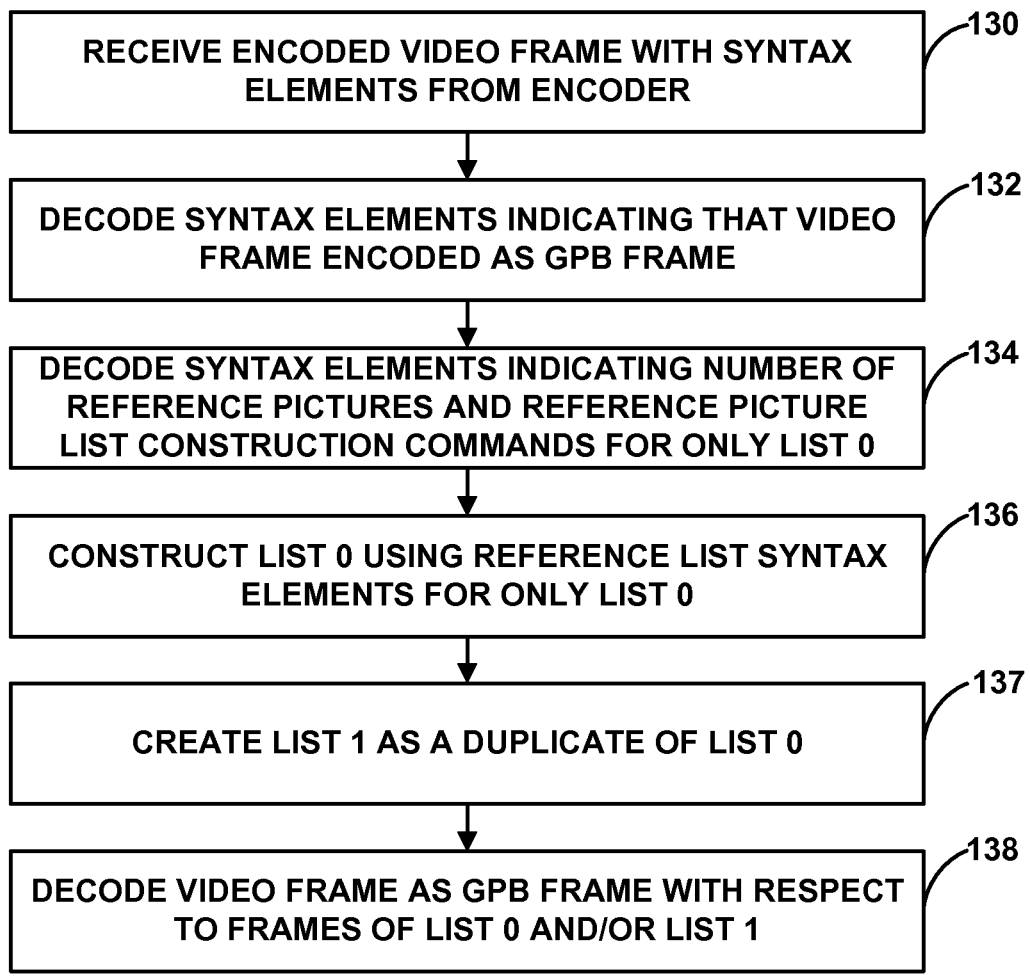
FIG. 6 is a flowchart illustrating an example operation of constructing the first reference picture list, and creating a second reference picture list as a duplicate of the first reference picture list.

FIG. 6 is a flowchart illustrating an example operation of constructing the first reference picture list, and creating a second reference picture list as a duplicate of the first reference picture list. The illustrated operation is described with reference to video decoder 30 of FIG. 4.

Video decoder 30 receives the encoded video frame with the syntax elements from video encoder 20 (130). Video decoder 30 may decode syntax elements indicating that the video frame is encoded as a GPB frame (132). In this way, video decoder 30 may expect to receive syntax elements indicating a number of reference pictures and reference picture list construction commands for only List 0 66, which may enable video decoder 30 to properly parse the syntax elements. According to the techniques of this disclosure, when the video frame is encoded as a GPB frame, video decoder 30 decodes syntax elements indicating a number of reference pictures and reference picture list construction commands for only List 0 94 (134).

Video decoder 30 then construct List 0 94 based on the reference picture list construction commands for only List 0 94 indicated by the syntax elements (136). For example, video decoder 30 may perform reference picture list initialization for List 0 94, and reference picture list reordering for List 0 94 using the syntax elements indicating reference picture list construction commands for List 0 94.

After constructing the first reference picture list, List 0 94, for the GPB frame, video decoder 30 may create the second reference picture list, List 1 96, as a duplicate of List 0 94 (137). More specifically, video decoder 30 may set a number of reference pictures for List 1 96 equal to the number of reference pictures for List 0 94, and then duplicate each reference index in List 0 94 into List 1 96. In this way, List 0 94 and List 1 96 contain identifiers for identical reference pictures. More specifically, the number of pictures included in each of List 0 94 and List 1 96 are identical, and a picture indicated by each index entry in List 0 94 is identical to the picture indicated by the same index entry in List 1 96.

Video decoder 30 may also apply prediction weights and offsets to reference pictures in List 0 94 and/or List 1 96. In some examples, video decoder 30 may only decode syntax elements indicating prediction weights and offsets for the first reference picture list. In that case, the same weight and offset values are applied to the identical reference pictures in List 0 94 and List 1 96. In other examples, video decoder 30 may decode separate syntax elements indicating different prediction weights and offsets for each of the first and second reference picture lists. In this case, different weight and offset values may be applied to the identical reference frames in each of List 0 94 and List 1 96.

Video decoder 30 may then decode the video frame as the GPB frame with respect to reference pictures of List 0 94 and/or List 1 96 (138). For example, video decoder 30 may decode the video frame as the GPB frame using unidirectional prediction from List 0 94, or using bidirectional prediction from both List 0 94 and List 1 96.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method of decoding video data comprising:
   decoding one or more syntax elements indicating that a video frame is coded as a generalized P/B (GPB) frame with respect to reference pictures in at least one of a first reference picture list or a second reference picture list, wherein the first and second reference picture lists are identical;
   decoding one or more syntax elements indicating a number of reference pictures and reference picture list construction commands for only the first reference picture list, wherein the reference picture list construction commands that are decoded for only the first reference picture list include at least commands for initializing the first reference picture list and reordering the reference pictures of the first reference picture list;
   constructing the first reference picture list at a video decoder based on the syntax elements, wherein constructing the first reference picture list comprises performing at least one of reference picture list initialization or reference picture list reordering for the first reference picture list; and
   creating the second reference picture list at the video decoder as a duplicate of the first reference picture list, wherein creating the second reference picture list comprises setting a number of reference pictures in the second reference picture list equal to the number of reference pictures in the first reference picture list, and duplicating each reference picture index in the first reference picture list into the second reference picture list.

2. The method of claim 1, wherein decoding one or more syntax elements indicating that a video frame is coded as a GPB frame comprises decoding a GPB slice type.

3. The method of claim 1, wherein decoding one or more syntax elements indicating that a video frame is coded as a GPB frame comprises decoding one of a P slice type with a GPB flag or a B slice type with a GPB flag.

4. The method of claim 1, further comprising decoding one or more syntax elements indicating first prediction weights and offsets for the first reference picture list,
   wherein constructing the first reference picture list comprises applying the first prediction weights and offsets to reference pictures in the first reference picture list; and
   wherein creating the second reference picture list comprises applying the first prediction weights and offsets to reference pictures in the second reference picture list.

5. The method of claim 1, further comprising decoding one or more syntax elements indicating first prediction weights and offsets for the first reference picture list and second prediction weights and offsets for the second reference picture list, wherein constructing the first reference picture list comprises applying the first prediction weights and offsets to reference pictures in the first reference picture list; and wherein creating the second reference picture list comprises applying the second prediction weights and offset to reference pictures in the second reference picture list.

6. The method of claim 1, further comprising receiving the syntax elements for the first reference picture list without receiving one or more syntax elements indicating a number of reference pictures and reference picture list construction commands for the second reference picture list.

7. A method of encoding video data comprising:
encoding a video frame as a generalized P/B (GPB) frame with respect to reference pictures in at least one of a first reference picture list or a second reference picture list, wherein the first and second reference picture lists are identical;
encoding one or more syntax elements indicating that the video frame is coded as the GPB frame; and
encoding one or more syntax elements indicating a number of reference pictures and reference picture list construction commands for only the first reference picture list, wherein the reference picture list construction commands that are encoded for only the first reference picture list include at least commands for initializing the first reference picture list and reordering the reference pictures of the first reference picture list.

8. The method of claim 7, wherein encoding the one or more syntax elements indicating that the video frame is coded as the GPB frame comprises encoding a GPB slice type.

9. The method of claim 7, wherein encoding the one or more syntax elements indicating that the video frame is coded as the GPB frame comprises encoding one of a P slice type with a GPB flag or a B slice type with a GPB flag.

10. The method of claim 7, further comprising encoding one or more syntax elements indicating first prediction weights and offsets for only the first reference picture list.

11. The method of claim 7, further comprising encoding one or more syntax elements indicating first prediction weights and offsets for the first reference picture list, and second prediction weights and offsets for the second reference picture list.

12. A video decoding device comprising:
a memory configured to store decoded reference pictures; and
a processor configured to:
decode one or more syntax elements indicating that a video frame is coded as a generalized P/B (GPB) frame with respect to reference pictures in at least one of a first reference picture list or a second reference picture list, wherein the first and second reference picture lists are identical,
decode one or more syntax elements indicating a number of reference pictures and reference picture list construction commands for only the first reference picture list, wherein the reference picture list construction commands that are decoded for only the first reference picture list include at least commands for initializing the first reference picture list and reordering the reference pictures of the first reference picture list,
construct the first reference picture list based on the syntax elements, wherein the processor is configured to perform at least one of reference picture list initialization or reference picture list reordering for the first reference picture list, and create the second reference picture list as a duplicate of the first reference picture list, wherein the processor is configured to set a number of reference pictures in the second reference picture list equal to the number of reference pictures in the first reference picture list, and duplicate each reference picture index in the first reference picture list into the second reference picture list.

13. The video decoding device of claim 12, wherein the processor decodes a GPB slice type indicating that the video frame is coded as the GPB frame.

14. The video decoding device of claim 12, wherein the processor decodes one of a P slice type with a GPB flag or a B slice type with a GPB flag indicating that the video frame is coded as the GPB frame.

15. The video decoding device of claim 12, wherein the processor decodes one or more syntax elements indicating first prediction weights and offsets for the first reference picture list, applies the first prediction weights and offsets to reference pictures in the first reference picture list, and applies the first prediction weights and offsets to reference pictures in the second reference picture list.

16. The video decoding device of claim 12, wherein the processor decodes one or more syntax elements indicating first prediction weights and offsets for the first reference picture list and second prediction weights and offsets for the second reference picture list, applies the first prediction weights and offsets to reference pictures in the first reference picture list, and applies the second prediction weights and offset to reference pictures in the second reference picture list.

17. The video decoding device of claim 12, wherein the processor receives the syntax elements for the first reference picture list without receiving one or more syntax elements indicating a number of reference pictures and reference picture list construction commands for the second reference picture list.

18. A video encoding device comprising:
a memory configured to store decoded reference pictures; and
a processor configured to:
encode a video frame as a generalized P/B (GPB) frame with respect to reference pictures in at least one of a first reference picture list or a second reference picture list, wherein the first and second reference picture lists are identical,
encode one or more syntax elements indicating that the video frame is coded as the GPB frame, and
encode one or more syntax elements indicating a number of reference pictures and reference picture list construction commands for only the first reference picture list, wherein the reference picture list construction commands that are encoded for only the first reference picture list include at least commands for initializing the first reference picture list and reordering the reference pictures of the first reference picture list.

19. The video encoding device of claim 18, wherein the processor encodes a GPB slice type indicating that the video frame is coded as the GPB frame.

20. The video encoding device of claim 18, wherein the processor encodes one of a P slice type with a GPB flag or a B slice type with a GPB flag indicating that the video frame is coded as the GPB frame.

21. The video encoding device of claim 18, wherein the processor encodes one or more syntax elements indicating first prediction weights and offsets for only the first reference picture list.

22. The video encoding device of claim 18, wherein the processor encodes one or more syntax elements indicating first prediction weights and offsets for the first reference picture list, and second prediction weights and offsets for the second reference picture list.

23. A video decoding device comprising:
means for decoding one or more syntax elements indicating that a video frame is coded as a generalized P/B (GPB) frame with respect to reference pictures in at least one of a first reference picture list or a second reference picture list, wherein the first and second reference picture lists are identical;
means for decoding one or more syntax elements indicating a number of reference pictures and reference picture list construction commands for only the first reference picture list, wherein the reference picture list construction commands that are decoded for only the first reference picture list include at least commands for initializing the first reference picture list and reordering the reference pictures of the first reference picture list;
means for constructing the first reference picture list at the video decoding device based on the syntax elements, wherein the means for constructing the first reference picture list comprise means for performing at least one of reference picture list initialization or reference picture list reordering for the first reference picture list; and
means for creating the second reference picture list at the video decoding device as a duplicate of the first reference picture list, wherein the means for creating the second reference picture list comprise means for setting a number of reference pictures in the second reference picture list equal to the number of reference pictures in the first reference picture list, and means for duplicating each reference picture index in the first reference picture list into the second reference picture list.

24. The video decoding device of claim 23, further comprising:
means for decoding one or more syntax elements indicating first prediction weights and offsets for the first reference picture list;
means for applying the first prediction weights and offsets to reference pictures in the first reference picture list; and
means for applying the first prediction weights and offsets to reference pictures in the second reference picture list.

25. The video decoding device of claim 23, further comprising:
means for decoding one or more syntax elements indicating first prediction weights and offsets for the first reference picture list and second prediction weights and offsets for the second reference picture list;
means for applying the first prediction weights and offsets to reference pictures in the first reference picture list; and
means for applying the second prediction weights and offset to reference pictures in the second reference picture list.

26. A video encoding device comprising:
means for encoding a video frame as a generalized P/B (GPB) frame with respect to reference pictures in at least one of a first reference picture list or a second reference picture list, wherein the first and second reference picture lists are identical;
means for encoding one or more syntax elements indicating that the video frame is coded as the GPB frame; and
means for encoding one or more syntax elements indicating a number of reference pictures and reference picture list construction commands for only the first reference picture list, wherein the reference picture list construction commands that are encoded for only the first reference picture list include at least commands for initializing the first reference picture list and reordering the reference pictures of the first reference picture list.

27. The video encoding device of claim 26, further comprising means for encoding one or more syntax elements indicating first prediction weights and offsets for only the first reference picture list.

28. The video encoding device of claim 26, further comprising means for encoding one or more syntax elements indicating first prediction weights and offsets for the first reference picture list, and second prediction weights and offsets for the second reference picture list.

29. A non-transitory computer-readable storage medium comprising instructions for decoding video data that, upon execution in a processor, cause the processor to:
decode one or more syntax elements indicating that a video frame is coded as a generalized P/B (GPB) frame with respect to reference pictures in at least one of a first reference picture list or a second reference picture list, wherein the first and second reference picture lists are identical;
decode one or more syntax elements indicating a number of reference pictures and reference picture list construction commands for only the first reference picture list, wherein the reference picture list construction commands that are decoded for only the first reference picture list include at least commands for initializing the first reference picture list and reordering the reference pictures of the first reference picture list;
construct the first reference picture list at a video decoder based on the syntax elements, wherein the instructions cause the processor to perform at least one of reference picture list initialization or reference picture list reordering for the first reference picture list; and
create the second reference picture list at the video decoder as a duplicate of the first reference picture list, wherein the instructions cause the processor to set a number of reference pictures in the second reference picture list equal to the number of reference pictures in the first reference picture list, and duplicate each reference picture index in the first reference picture list into the second reference picture list.

30. The non-transitory computer-readable storage medium of claim 29, further comprising instructions that cause the processor to:
decode one or more syntax elements indicating first prediction weights and offsets for the first reference picture list;
apply the first prediction weights and offsets to reference pictures in the first reference picture list; and
apply the first prediction weights and offsets to reference pictures in the second reference picture list.

31. The non-transitory computer-readable storage medium of claim 29, further comprising instructions that cause the processor to:
decode one or more syntax elements indicating first prediction weights and offsets for the first reference picture list and second prediction weights and offsets for the second reference picture list;

apply the first prediction weights and offsets to reference pictures in the first reference picture list; and apply the second prediction weights and offset to reference pictures in the second reference picture list.

32. A non-transitory computer-readable storage medium comprising instructions for encoding video data that, upon execution in a processor, cause the processor to:

encode a video frame as a generalized P/B (GPB) frame with respect to reference pictures in at least one of a first reference picture list or a second reference picture list, wherein the first and second reference picture lists are identical;

encode one or more syntax elements indicating that the video frame is coded as the GPB frame; and encode one or more syntax elements indicating a number of reference pictures and reference picture list construction commands for only the first reference picture list, wherein the reference picture list construction commands that are encoded for only the first reference picture list include at least commands for initializing the first reference picture list and reordering the reference pictures of the first reference picture list.

33. The non-transitory computer-readable storage medium of claim 32, further comprising instructions that cause the processor to encode one or more syntax elements indicating first prediction weights and offsets for only the first reference picture list.

34. The non-transitory computer-readable storage medium of claim 32, further comprising instructions that cause the processor to encode one or more syntax elements indicating first prediction weights and offsets for the first reference picture list, and second prediction weights and offsets for the second reference picture list.

* * * * *